United States Patent [19]

Guzay, Jr. et al.

[11] 4,228,709
[45] Oct. 21, 1980

[54] FLAT CABLE PREPARATION TOOL ASSEMBLY

[75] Inventors: Casimer M. Guzay, Jr., Hoffman Estates; Jack E. Caveney, Hinsdale, both of Ill.

[73] Assignee: Panduit Corp., Tinley Park, Ill.

[21] Appl. No.: 45,497

[22] Filed: Jun. 4, 1979

[51] Int. Cl.³ .............................................. B26D 9/00
[52] U.S. Cl. ........................................ 83/620; 83/622; 83/688; 29/564.4; 29/564.6, 868
[58] Field of Search .................. 83/620, 618, 621, 622, 83/681, 688; 29/564.4, 564.1, 564.2, 564.7, 564.6; 29/628

[56] References Cited

U.S. PATENT DOCUMENTS

| 516,735 | 3/1894 | Hammond | 83/688 |
|---|---|---|---|
| 3,812,754 | 5/1974 | Kawakami | 83/688 |
| 3,924,923 | 12/1975 | Shoemaker | 339/278 M |
| 3,938,246 | 2/1976 | Over et al. | 29/628 |
| 3,956,952 | 5/1976 | Goettel et al. | 83/622 |
| 4,046,045 | 9/1977 | Stevens | 83/620 |
| 4,075,758 | 2/1978 | Parsons et al. | 29/628 |
| 4,130,040 | 12/1978 | Donnelly | 83/389 |
| 4,130,934 | 12/1978 | Asick et al. | 29/628 |

*Primary Examiner*—Donald R. Schran
*Attorney, Agent, or Firm*—Richard B. Wakely; Charles R. Wentzel

[57] ABSTRACT

A tool assembly for use with a prime mover, such as a bench press, to prepare a flat cable for its termination in a mass termination connector. The assembly includes upper and lower supports, at least one of which is adapted for attachment to the prime mover, for reciprocal movement relative to one another. The assembly further includes punch means carried by one of the supports, cutter means carried by one of the supports and selectively operable stop means for limiting relative movement of the supports. The punch means forms a series of windows in the cable insulation between adjacent conductors of the flat cable, the windows being aligned in a row extending transversely of the longitudinal direction of the cable. The cutter means severs the conductor of the flat cable adjacent the windows. The punch means extends further toward the support which does not carry the punch means than the cutter means extends toward the support which does not carry the cutter means. The supports are movable relative to one another between an open position wherein a flat cable disposed between the supports is not punched or cut and a closed position wherein the windows are punched and the conductors severed and through an intermediate position in which the cable is punched but the conductors are not cut. The stop means selectively limits relative movement of the supports to the intermediate position whereby a single tool assembly selectively prepares flat cables for either daisy chain connection or dead end connection.

17 Claims, 12 Drawing Figures

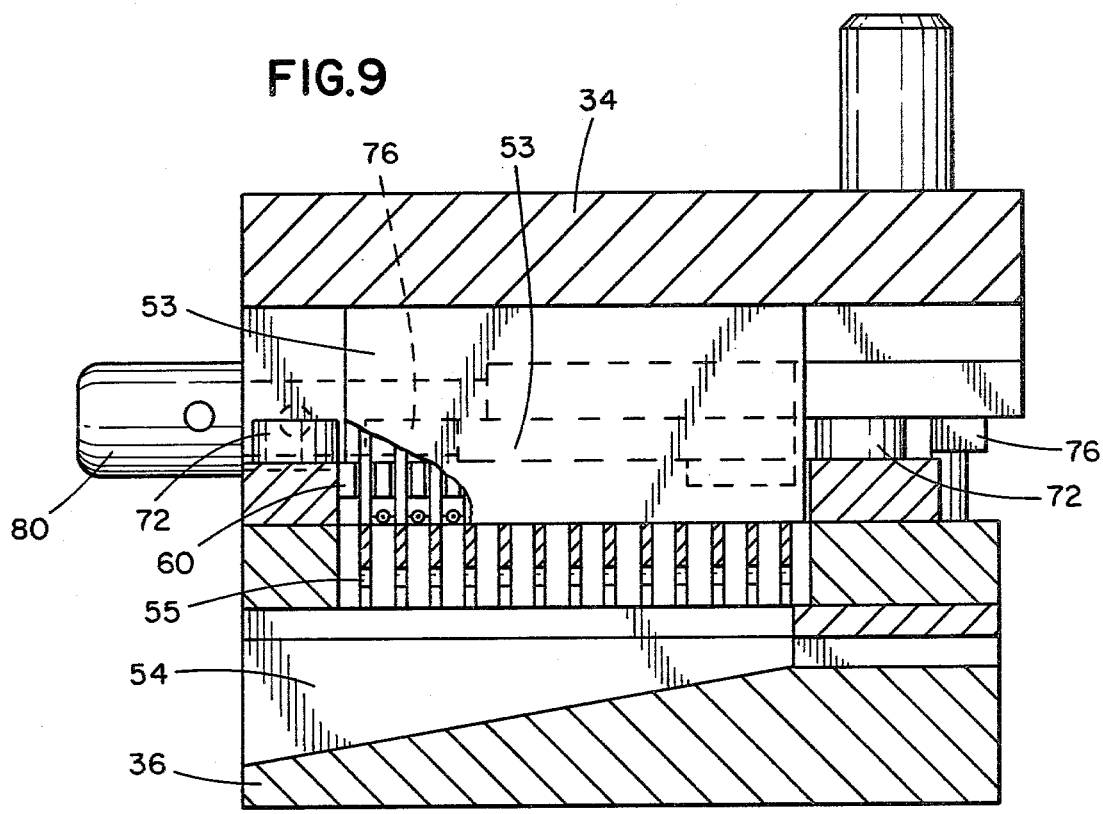

FLAT CABLE PREPARATION TOOL ASSEMBLY

BACKGROUND OF THE INVENTION

This invention relates to tool assemblies for preparing wiring for termination in a connector by selectively removing insulation and more particularly for preparing a flat cable for termination in a mass termination connector.

Mass termination connectors, which function to remove the insulation from and electrically terminate a plurality of conductors in response to a single stroke of an insertion tool, are coming into increasing commercial prominence because of the great savings of tedious manual operations attendant their use compared with the previous wiring method of stripping the individual wires, placing a terminal on each wire and crimping the respective terminals about the respective wires. A mass termination connector, an example of which is fully disclosed in commonly assigned U.S. patent application Ser. No. 909,732, typically has a housing which includes a front wall and a back wall joined by a plurality of spaced barrier walls which define an array of cavities for holding the individual metallic terminal elements. Aligned openings in the front and back walls extend from the wire-receiving face of the housing to provide entrances to the various cavities. While this housing configuration works well when discrete wires are used with the connector, an as-fabricated flat cable cannot be terminated because the insulation webs between adjacent conductors interfere with the barrier walls which terminate substantially flush with the wire-receiving face of the housing.

In order to accommodate the connector housing, openings have to be formed in the webs of insulation between adjacent conductors to receive the barrier walls. Previously this was accomplished using a hand punch; or a dieset comprising a series of punches, on the same centers as the conductors in the flat cable, was fabricated for use with a bench press. Shortcomings of such methods were that alignment of the flat cable with the punches was difficult and they were typically used for preparing a flat cable for only a daisy chain connection, where the connector is joined to the cable intermediate its ends. Where a dead end connection was required, the flat cable had to undergo a second cutting operation, e.g., by using a scissors.

Several special purpose tool assemblies adapted for use with bench presses to prepare flat cables have been proposed. One such tool assembly functions to square the end of the cable and remove flash from the cable sides so that the cable can be used with a connector having extending terminal elements which pierce the insulation webs. Another assembly functions to slit the end of a flat cable to divide the conductors into groups. Finally, another assembly slits the web adjacent the conductors and bends the conductors into loops extending from the surface of the flat cable. Reference may be made to U.S. Pat. Nos. 4,130,040; 4,046,045 and 4,130,934.

SUMMARY OF THE INVENTION

Among the several objects of the present invention may be noted the provision of an improved tool assembly for preparing a flat cable for termination in a mass termination connector; the provision of such a tool assembly which selectively prepares a flat cable for either daisy chain or dead end connection; the provision of such a tool assembly which simultaneously prepares a flat cable for two dead end connections; the provision of such a tool assembly which provides openings in the flat cable which are properly aligned to receive the barrier walls of the connector housing; and the provision of such a tool assembly which has long service life and is simple and economical to manufacture. Other objects and features will be in part apparent and in part pointed out hereinafter in the specifications and in the claims.

Briefly, the tool assembly of the present invention includes upper and lower supports relatively movable to one another, punch means carried by one of the supports, cutter means carried by one of the supports, and stop means for limiting relative movement of the supports. The punch means forms a series of windows in the flat cable insulation while the cutter means severs the conductors of the flat cable. The punch means extends further than does the cutter means so that the supports are relatively movable between an open position and a closed position wherein the cable is punched and cut, and through an intermediate position wherein the cable is only punched. The stop means is selectively operable to limit the supports to their intermediate position.

BRIEF DESCRIPTION OF THE DRAWINGS

FIG. 9, similar to FIG. 8, is a sectional view showing the tool assembly preparing the flat cable for dead end connection;

FIG. 10 is a perspective view of a connector, with certain components removed, with a flat cable terminated therein in daisy chain fashion;

Corresponding reference characters indicate corresponding parts throughout the several views of the drawings.

DESCRIPTION OF THE PREFERRED EMBODIMENT

Figure 1:
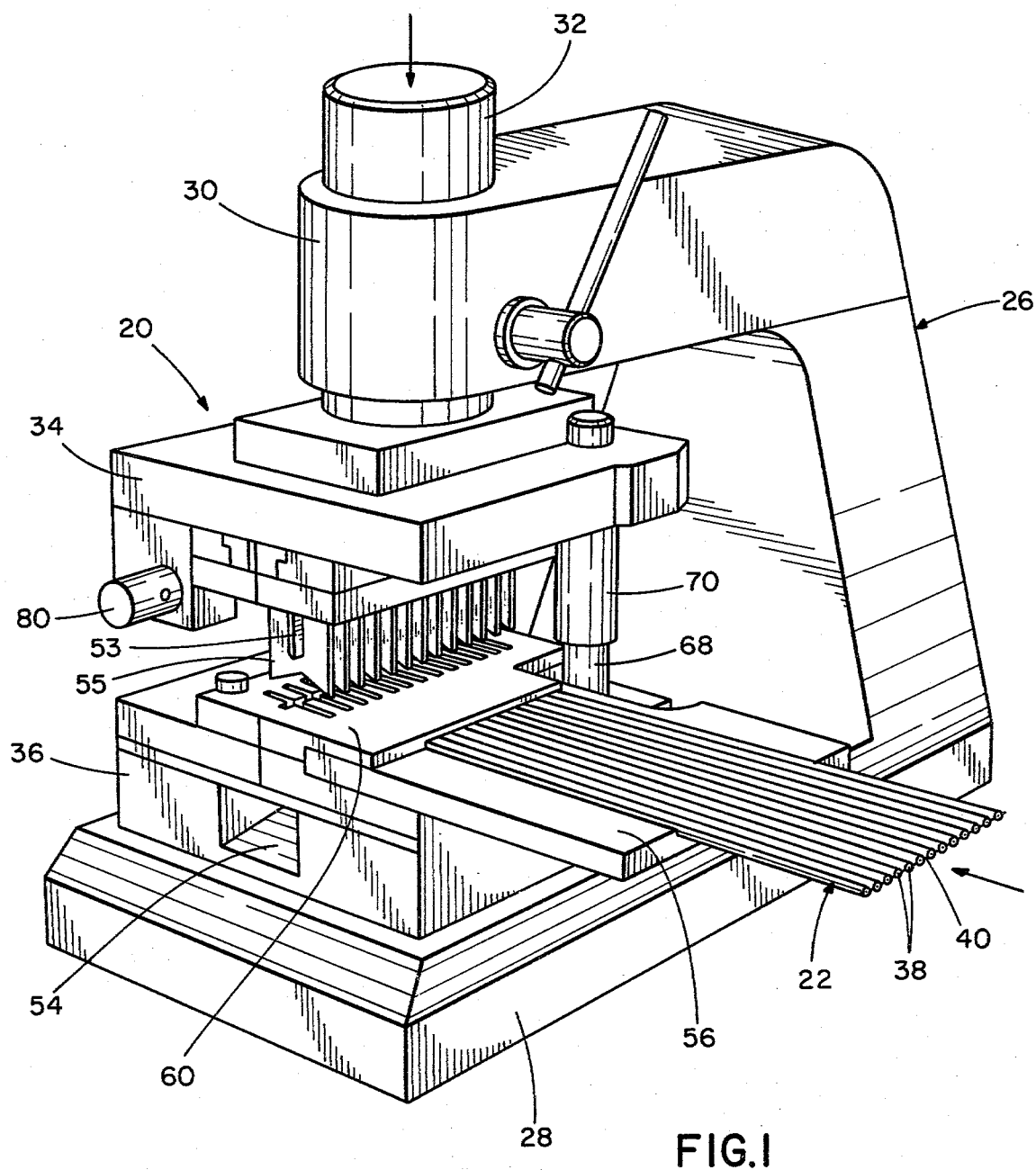
FIG. 1 is a perspective view of the flat cable preparation tool assembly of the present invention mounted on a bench press with a flat cable positioned in the tool assembly.
Figure 2:
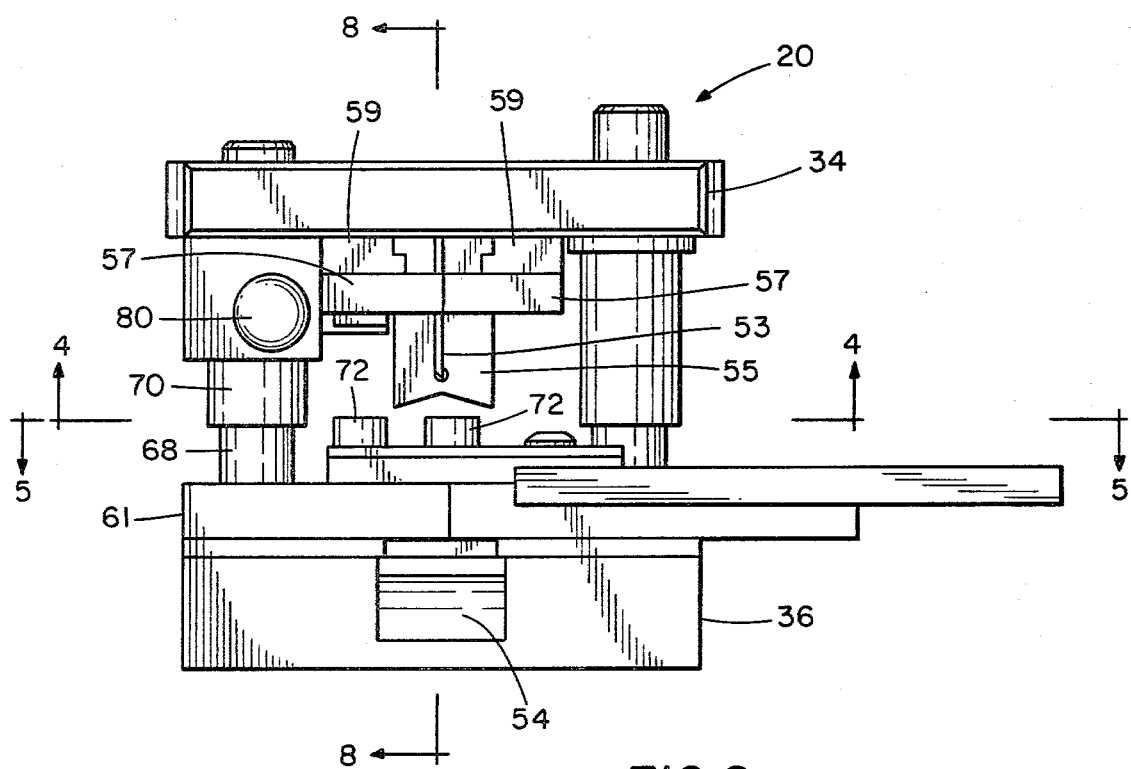
FIG. 2 is a front elevational view of the tool assembly of FIG. 1.
Figure 3:
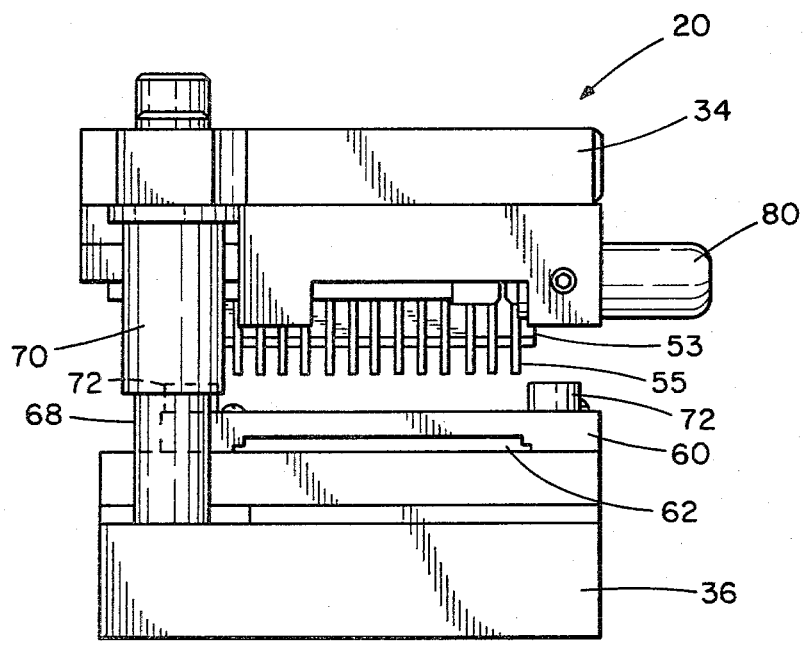
FIG. 3 is a side elevational view of the tool assembly.

Referring now to the drawings, a tool assembly for preparing a flat cable 22 for termination in a mass termination connector 24 (shown in FIG. 10) is generally indicated in FIGS. 1, 2 and 3 by reference numeral 20. Tool assembly 20 is adapted for mounting on a prime mover such as bench press 26, shown in FIG. 1, which comprises a "C"-shaped frame including a bed 28 and a head 30 housing a ram 32 which can be reciprocated relative the bed. The tool assembly comprises an upper support 34 attached to the ram and a lower support 36 which is preferably fixed to bed 28.

Figure 6:
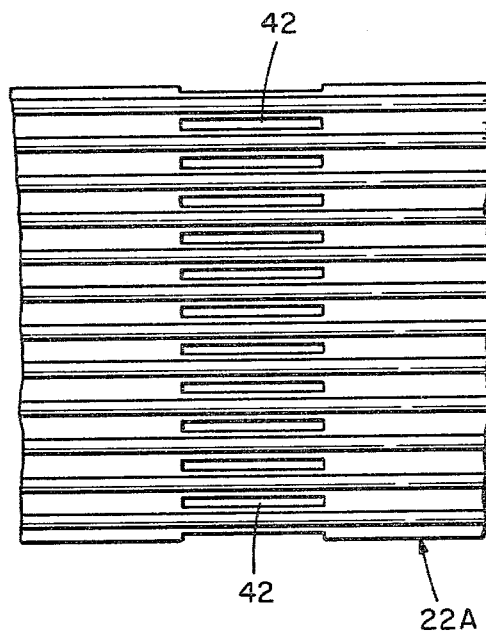
FIG. 6 depicts a length of flat cable prepared for daisy chain connection.

Flat cable 22 can be of the type comprising a plurality of spaced, parallel conductors 38 sandwiched between upper and lower layers of insulation with the insulation between adjacent conductors forming webs 40. Alternatively, the flat cable could be formed by extruding the insulation about the conductors. Referring to FIG. 6, tool assembly 20 functions to form a series of windows 42, aligned in a row extending transversely of the longitudinal direction of cable 22, so that the cable can be joined to connector 24.

Figure 7:
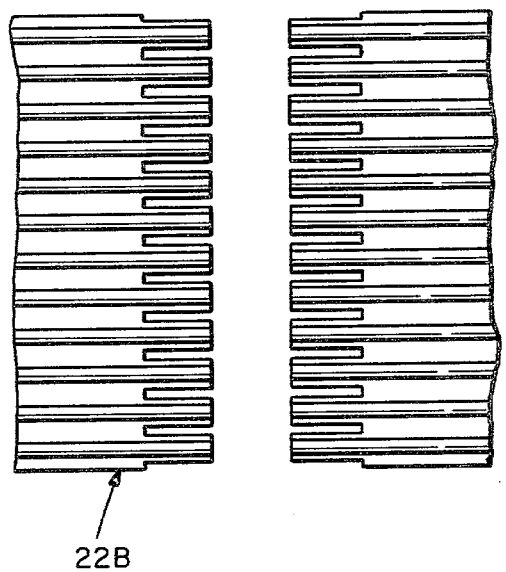
FIG. 7 illustrates a length of flat cable prepared for dead end connection.

More specifically and referring to FIG. 10, connector 24 includes connector housing 43 comprising a front wall 44, a back wall 46 and a plurality of spaced barrier walls 48 joining the aforementioned walls to define an array of cavities for receiving metallic terminal elements 50. Aligned wire-receiving openings in the front and back walls extend from a wire-receiving face 52 of the housing to permit entrance of the wires in the cavities. Flat cable 22A, shown in FIG. 6, has been prepared for what is commonly known in the art as "daisy chain" connection, i.e., where the connector is joined to the flat cable intermediate the ends thereof. A flat cable 22B, shown in FIG. 7, has been prepared for a pair of "dead-end" connections, i.e. where one end of the flat cable is joined to the connector.

Figure 4:
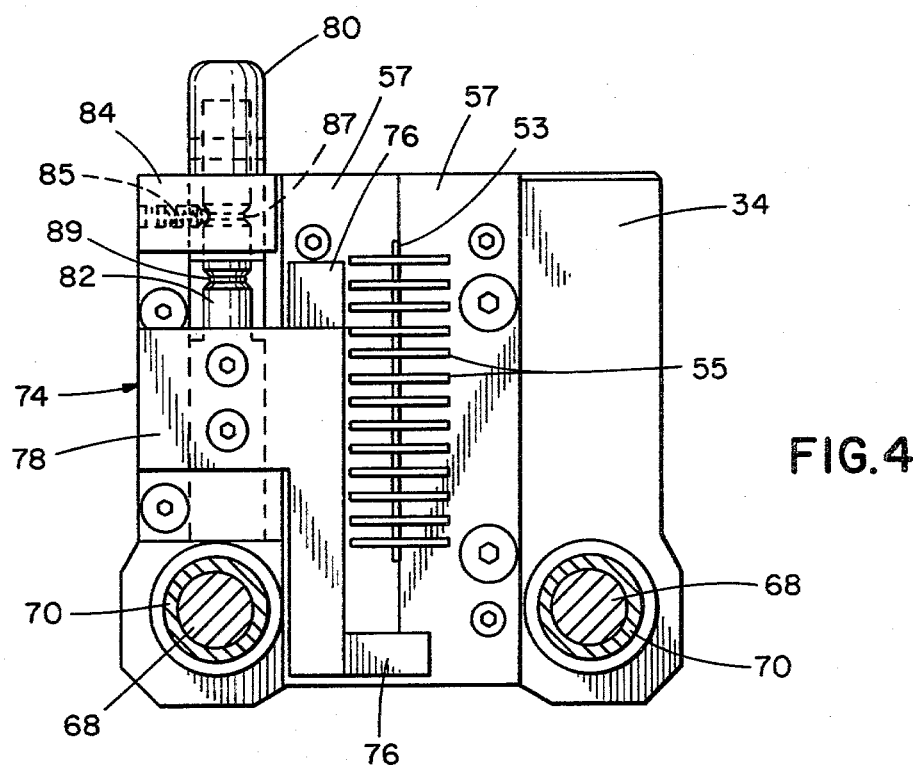
FIG. 4 is a sectional view taken generally along line 4—4 of FIG. 2.

Tool assembly 20 comprises punch means carried by one of the supports for forming the series of windows 42 in the flat cable insulation between adjacent conductors of the flat cable. The assembly also includes cutter means carried by one of the supports for severing the conductors of the flat cable adjacent windows 42. The punch means extends further toward the support which does not carry the punch means than the cutter means extends toward the support which does not carry the cutter means. More specifically, both the punch means and the cutter means are carried by upper support 34. Referring to FIGS. 2, 3 and 4, the cutter means comprises a cutter blade 53 while the punch means includes a series of aligned, spaced punches 55 each of which is deeply slotted for receiving the cutter blade. Punches 55, which have "T"-shaped heads, and cutter blade 44 are held to upper support 34 by means of slotted combs 57 which hold the punches properly spaced and spacers 59, engageable with the heads of the punches, which are bolted to upper support 34.

The upper and lower supports are movable relative to one another between an open position, shown in FIG. 1, wherein a flat cable disposed between supports 34, 36 is neither punched nor cut and a closed position, shown in FIG. 9, wherein windows 42 are punched and the conductors are severed. The supports also have an intermediate position, shown in FIG. 8, in which the cable insulation is punched but the conductors are not severed.

Figure 5:
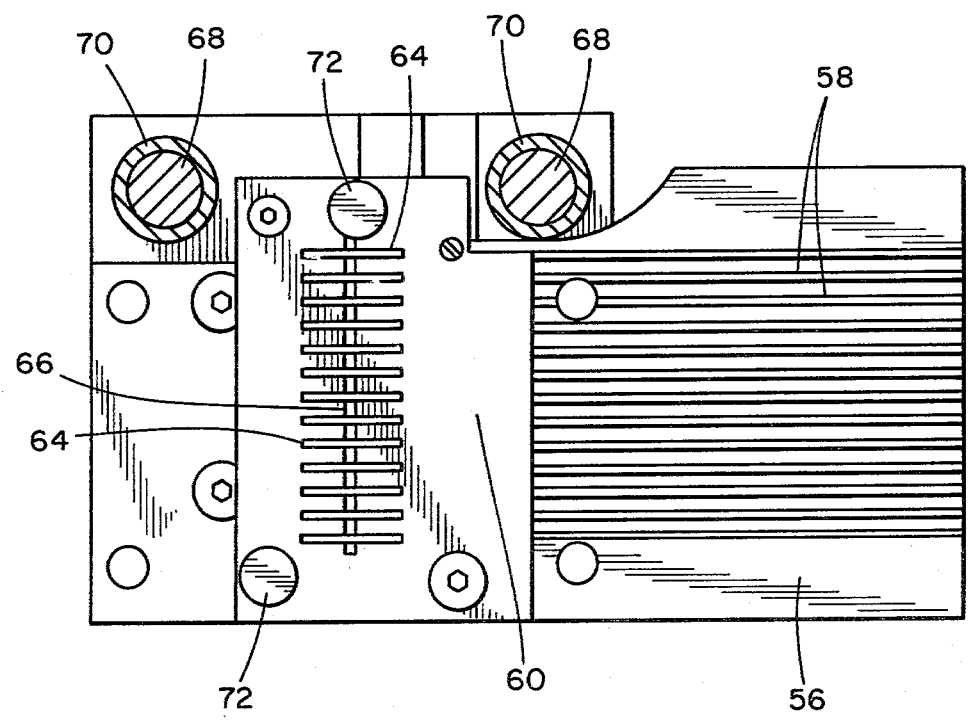
FIG. 5 is a sectional view taken generally along line 5—5 of FIG. 2.

The lower support 36 includes a plate assembly 61, best shown in FIG. 2, for supporting flat cable 22 and having a series of punch-receiving apertures. Underlying plate assembly 61 is a chute 54 for receiving scrap and directing it away from the tool assembly. Typically a surface of a flat cable has a series of regularly spaced ribs, formed where the insulation overlies the conductors, and lower support 36 includes a table 56 (best shown in FIG. 5) having a plurality of spaced grooves 58 for receiving the ribs to align the flat cable with the punches 55. The lower support also includes bridge structure 60 extending over table 56 and defining therewith an opening 62 for receiving the flat cable 22. The lower surface of bridge structure 60, which partially defines opening 62, also preferably has grooves for receiving the ribs of the flat cable to aid in alignment of the cable relative to the punches. The bridge structure, which includes punch receiving apertures 64 aligned with those of plate assembly 61 as well as an opening 66 permitting passage of cutter blade 53, functions as a holding means to hold the flat cable against upward movement with upper support 34 thereby to strip the flat cable from the punches and the cutter blade.

Extending from lower support 36 are a pair of spaced posts 68 which are received in close-fitting sliding relationship by a pair of similarly spaced sleeves 70 extending from upper support 34. Posts 68 and sleeves 70 insure that the upper and lower supports remain in accurate alignment during their relative movement.

Tool assembly 20 further comprises selectively operable stop means for limiting relative movement of the supports to their intermediate position. The stop means includes a pair of spaced stop pins 72 (best shown in FIG. 5) positioned on plate assembly 61 and extending through apertures in bridge structure 60 toward upper support 34. The stop means also includes a slide assembly 74 carried by upper support 34. The slide assembly, best shown in FIG. 4, includes a pair of abutment pads 76 selectively alignable with stop pins 72. Pads 76 are attached to a slide plate 78 which in turn is connected to a handle 80 by an adjustment rod 82 which extends through an opening in a holding block 84 mounted on upper support 34. Slide plate 78, which slides on one of the combs 57, is movable by means of handle 80 from a first position, shown in FIG. 8, wherein the abutment pads 76 are aligned with stop pins 72 to limit movement of the upper support to the intermediate position to a second position, shown in FIGS. 4 and 9, in which abutment pads 76 are out of alignment with the stop pins. Referring to FIG. 4, holding block 84 houses a spring biased detent 85 which is received in annular grooves 87 or 89 in rod 82. When detent 85 is received in groove 87, pads 76 are out of alignment with pins 72 and when detent 85 is received in groove 89, pads 76 are aligned with pins 72.

It should be noted, referring to FIG. 6, that windows 42, have a longitudinal axis parallel to the longitudinal axis of flat cable 22 and windows 42 preferably have a length substantially twice the spacing between the front wall 44 and back wall 46 of connector housing 43. Furthermore and referring to FIGS. 2 and 4, cutter blade 53 is positioned to sever the flat cable conductors substantially midway between the ends of the windows so that the flat cable is prepared for a pair of dead end connections by a single stroke of the tool assembly.

Figure 8:
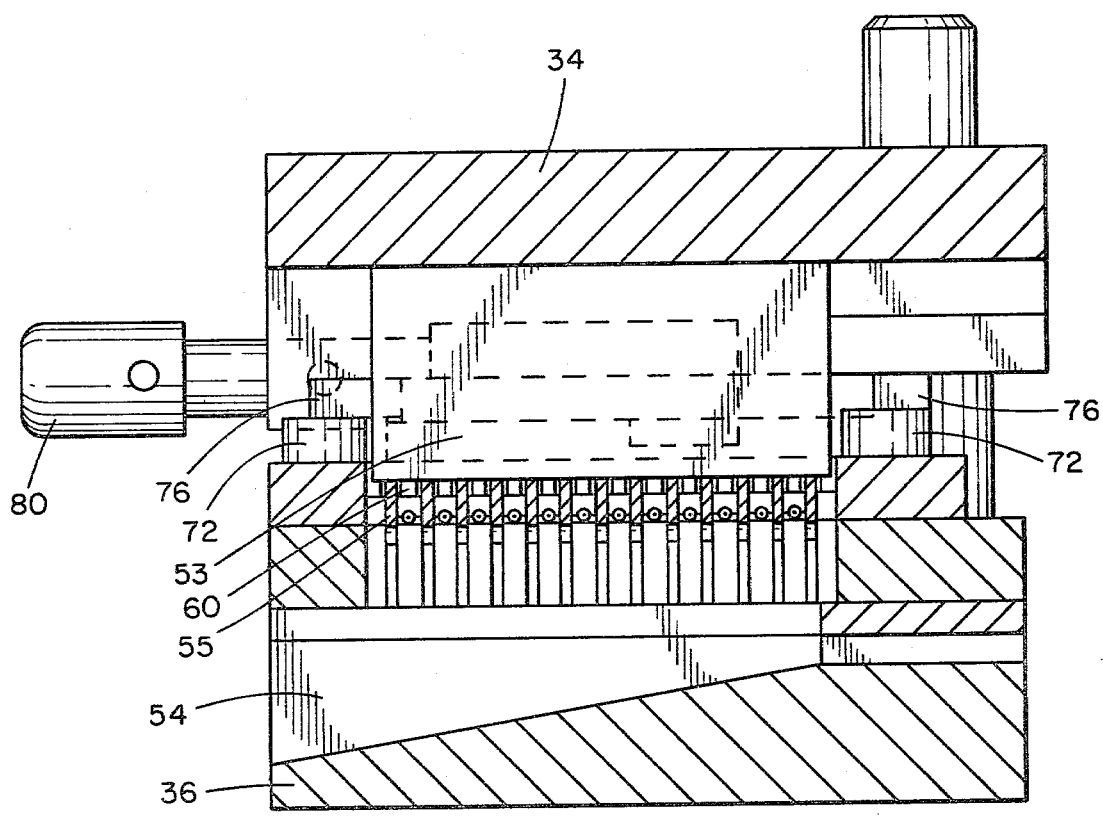
FIG. 8 is a sectional view showing the tool assembly preparing the flat cable for daisy chain connection.

Operation of the tool assembly 20 of the present invention is as follows: With upper support 34 attached to ram 32 and lower support 36 fixed to bench press bed 28, the flat cable 22 to be prepared for termination is threaded between bridge structure 60 and table 56 until the cable underlies punches 55. If it is desired to prepare the cable for daisy chain connection, the slide plate 78 is moved to its first position wherein pads 76 are aligned with pins 72. Upon operation of the press, as shown in FIG. 8, relative movement of the upper and lower supports is limited to their intermediate position so that only windows 42 are punched. As the ram returns, the prepared cable is stripped from the punches 55 due to the presence of bridge structure 60. Alternatively, if the flat cable is to be prepared for dead end connection slide plate 78 is merely moved to its second position so that the pads are out of alignment with the stop pins. Upon operation of the bench press, the upper and lower supports undergo relative movement to their closed position, shown in FIG. 9, wherein the windows are punched and the conductors severed.

In a prior art method of flat cable preparation, the windows were first punched and then, if a dead end connection was desired, the flat cable was severed by, typically, using a scissors or a paper cutter. The method of prior art cutting had two shortcomings. Firstly, operator judgement was required to properly align the flat cable with the cutting means. Secondly, both a scissors and a paper cutter sever with a slicing action moving from one side of the flat cable to the other. Slicing something as thick as a flat cable often results in the object undergoing cutting pulling to one side of the cutter resulting in an angled cut rather than a square cut. In sharp contrast, the present tool assembly uniformly prepares satisfactory dead end connections because the cutter blade 53 cuts all the flat cable conductors simultaneously. Even when the flat cable is to be prepared for a single dead end connection, the operator need only thread the flat cable so that it fully underlies cutter blade 44.

It will be appreciated that the selectively operable stop means constitutes means for selectively preventing the cutter blade 53 from severing the conductors when the punches 55 form windows 42. It is within the spirit and scope of the present invention that fixed cutter blade 53 be movable relative to punches 55 so that the conductors are not severed when supports 34 and 36 are physically in their closed position, as a replacement for stops 72 and abutments 76. This would similarly effect the desideratum that a single tool assembly can prepare the flat cable for either dead end or daisy chain connection.

Figure 11:
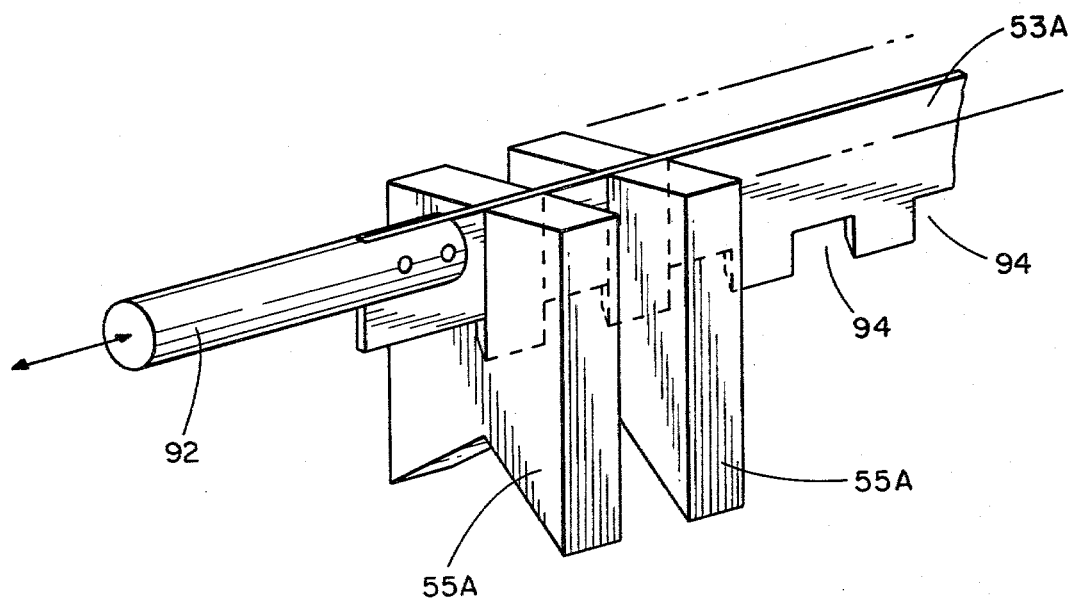
FIG. 11 is a perspective view of an alternate embodiment of a cutter means of the present invention for selectively severing the conductors of the flat cable.
Figure 12:
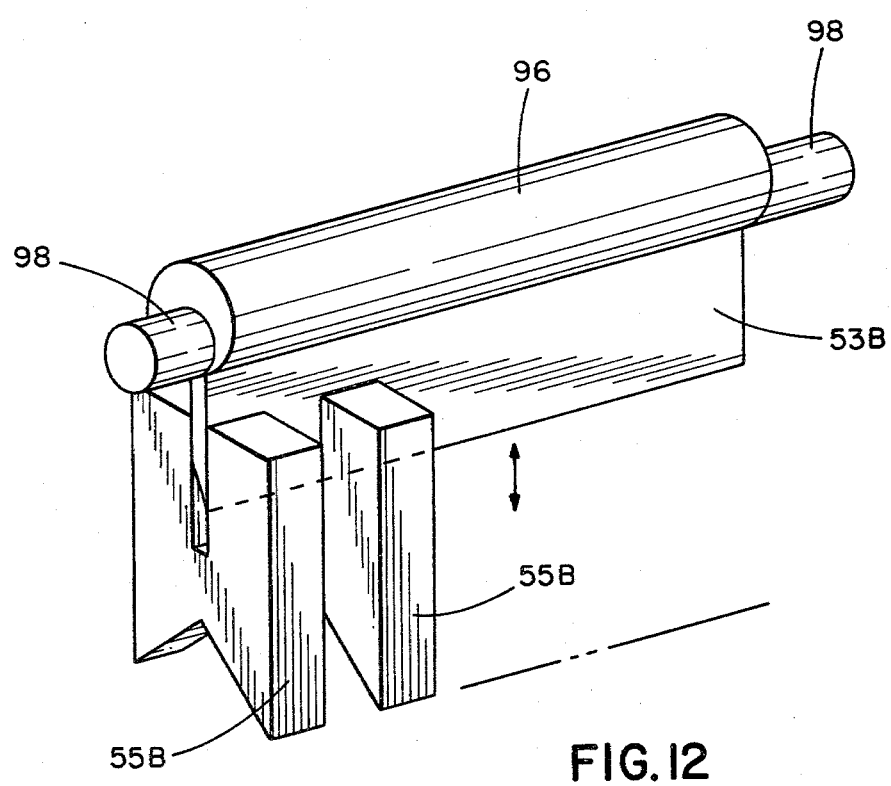
FIG. 12 is a perspective view of another alternate embodiment of the cutter means.

More specifically, configurations in which the cutter blade is movable relative to the punches are shown in FIGS. 11 and 12. Referring to FIG. 11, a cutter blade 53A which is transversely movable relative punches 55A by means of a handle 92, includes regularly spaced removed sections 94. As shown in FIG. 11, when removed sections 94 are disposed between adjacent punches the conductors of the flat cable are not severed when the supports undergo relative movement to their closed position. However, if cutter blade 53A is shifted slightly so that removed sections 94 are aligned with punches 55A, cutter blade 53A will sever the flat cable conductors when the supports are moved to their closed position.

Referring to FIG. 12, a cylinder 96 which functions as a cam has trunnions 98, eccentric relative to the cylinder, extending from the ends thereof. Trunnions 98 are pivotally carried by blocks (not shown) held by the upper support. It will be appreciated that in the position of the cylinder shown in FIG. 12, cutter blade 53B is movable in a vertical plane relative to punches 55B so that the flat cable conductors are not severed when the supports are closed. However, if cylinder 96 is rotated one-half turn, the cylinder will move the cutter blade downwardly relative the punches and hold the cutter blade against upward movement relative the punches resulting in severance of the flat cable conductors when the supports are moved to their closed position.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. A tool assembly for use with a prime mover, such as a bench press, to prepare a flat cable for its termination in a mass termination connector, said assembly comprising:

upper and lower supports, at least one of which is adapted for attachment to said prime mover, for reciprocal movement relative to one another;

punch means carried by one of said supports for forming a series of windows in the flat cable insulation between adjacent conductors of the flat cable, said windows being aligned in a row extending transversely of the longitudinal direction of said cable;

cutter means carried by one of said supports for severing the conductors of said flat cable adjacent said windows, said punch means extending further toward the support which does not carry the punch means than the cutter means extends toward the support which does not carry the cutter means, said supports being movable relative to one another between an open position wherein a flat cable disposed between said supports is not punched or cut and a closed position wherein said windows are punched and said conductors severed, through an intermediate position wherein said cable is punched but the conductors are not cut;

said assembly further comprising selectively operable stop means for limiting relative movement of said supports to said intermediate position whereby a single tool assembly selectively prepares flat cables for either daisy chain connection or dead end connection.

2. A tool assembly as set forth in claim 1 wherein said connector includes a front wall, a back wall and a plurality of spaced barrier walls interconnecting said front and back walls and defining therewith an array of cavities for receiving metallic terminal elements, said windows having a longitudinal axis parallel to the longitudinal axis of said cable, said windows having lengths substantially at least twice the spacing between said front wall and said back wall of said connector.

3. A tool assembly as set forth in claim 2 wherein said cutter means is positioned to sever the conductors substantially midway between the ends of the windows adjacent thereto whereby a flat cable is prepared for a pair of dead end connectors by a single stroke of said tool assembly.

4. A tool assembly as set forth in claim 1 wherein said upper support carries said punch means and said cutter means.

5. A tool assembly as set forth in claim 4 wherein said lower support is stationary and supports said flat cable, said lower support comprising holding means for preventing said cable from moving with said upper support as said upper support moves toward said open position.

6. A tool assembly as set forth in claim 1 further comprises a pair of spaced posts extending vertically from one of said upper and lower supports, and a pair of similarly spaced sleeves extending vertically from the other of said upper and lower supports for receiving said posts in close-fitting sliding telescopic relationship whereby said upper and lower supports are held in alignment.

7. A tool assembly as set forth in claim 1 wherein said stop means comprises a stop carried by one of said supports and extending toward the other of said supports.

8. A tool assembly as set forth in claim 7 wherein said stop means further comprises a slide assembly carried by the support which does not carry said stop, said slide assembly including an abutment movable between a first position wherein said abutment is aligned with said stop to limit relative movement of said supports to said intermediate position, and a second position wherein said abutment is out of alignment with said stop to permit relative movement of said supports to said closed position.

9. A tool assembly as set forth in claim 4 wherein a plurality of regularly spaced parallel ribs extend from a surface of said flat cable, said lower support comprising a table having a plurality of spaced grooves for receiving ones of said plurality of ribs to align said cable with said punch means.

10. A tool assembly as set forth in claim 9 wherein said lower support further comprises a bridge structure extending over said table and defining therewith an opening for receiving said flat cable, said bridge structure holding said cable against movement with said upper support.

11. A tool assembly as set forth in claim 4 wherein said punch means comprises a series of aligned punches.

12. A tool assembly as set forth in claim 11 wherein said lower support includes a plate assembly for supporting said cable and having a series of punch-receiving apertures.

13. A tool assembly as set forth in claim 12 wherein said lower support includes a chute underlying said plate assembly for receiving scrap and directing it away from said plate assembly.

14. A tool assembly for preparing a flat cable for termination in a mass termination connector, said assembly being adapted for mounting on a bench press of the type having a bed and a ram which reciprocates relative to said bed, said tool assembly comprising:
an upper support attached to said ram;
a lower support for supporting said cable and positioned on said bed;
a series of regularly spaced, aligned punches extending from said upper support for forming a series of windows in the flat cable insulation with one window between each adjacent pair of conductors; and
a cutter means extending from said upper support and terminating short of said punch dies for severing each conductor between adjacent windows whereby the selective limitation of the stroke of said ram results in preparation of said cable for either daisy chain or, alternatively, dead end connection.

15. A tool assembly for use with a prime mover, such as a bench press, to prepare a flat cable for its termination in a mass termination connector, said assembly comprising:
upper and lower supports, at least one of which is adapted for attachment to said prime mover, for reciprocal movement relative to one another;
punch means carried by one of said supports for forming a series of windows in the flat cable insulation between adjacent conductors of the flat cable, said windows being aligned in a row extending transversely of the longitudinal direction of the cable;
cutter means carried by one of said supports for severing the conductors of said flat cable adjacent said windows, said punch means having a position relative said cutter means wherein said punch means extends further toward the support which does not carry the punch means than the cutter means extends toward the support which does not carry the cutter means, said supports being movable relative to one another between an open position in which a flat cable disposed between said supports is not punched or cut and a closed position in which said windows are punched; and
means for selectively preventing said cutter means from severing said conductors when said punch means forms said windows whereby a single tool assembly selectively prepares flat cables for either daisy chain connection or dead end connection.

16. A tool assembly as set forth in claim 15 wherein said conductors are severed when said supports are in said closed position, said supports being movable through an intermediate position in which said cable is punched but the conductors are not cut, said means for selectively preventing said cutter means from severing said conductors comprising selectively operable stop means for limiting relative movement of said supports to said intermediate position.

17. A tool assembly as set forth in claim 15 wherein said cutter means comprises a cutter blade and said punch means comprises a series of spaced punches, said blade being movable relative to said punches.

* * * * *